Patented Jan. 9, 1951

2,537,934

UNITED STATES PATENT OFFICE 2,537,934

ANTIBIOTIC SALTS OF MONO (HIGHER-ALIPHATIC) SULFATES, PREPARATION OF THESE SALTS, AND PURIFICATION OF THE ANTIBIOTICS THEREBY

William A. Lott, Maplewood, Jack Bernstein, New Brunswick, and Leon J. Heuser, Robbinsville, N. J., assignors to E. R. Squibb & Sons, New York, N. Y., a corporation of New York No Drawing. Application August 9, 1947, Serial No. 767,852

12 Claims. (Cl. 260—210)

This invention relates to basic antibiotics of the streptomycin type, i. e., to members of the genus composed of streptomycin and antibiotically-active basic compounds which (like streptomycin) are capable of forming water-soluble salts with acids such as sulfuric and water-insoluble salts with organic base-precipitating reagents (e. g., derivatives of streptomycin, such as dihydrostreptomycin, and similarly-acting antibiotics, such as streptothricin).

In 1944, Schatz, Bugie, and Waksman (Proc. Soc. Exp. Biol. Med. 1944, 57, 244) showed that a potent antibiotic, termed "streptomycin," was formed during the growth of the organism *Actinomyces griseus* (now called *Streptomyces griseus*); and this antibiotic has since been demonstrated to be of high clinical utility.

It was later found that a number of streptomycins are formed at the same time. The first streptomycin obtained in pure crystalline form (as a reineckate) and fully characterized (Wintersteiner and Fried application, Serial No. 666,-541, filed May 1, 1946, now Patent No. 2,501,014, dated March 21, 1950) is now referred to as "streptomycin A"; and the second streptomycin characterized (Fried and Titus application Serial No. 737,400, filed March 26, 1947) is now referred to as "streptomycin B." Moreover, there are indications that still other streptomycins are formed at the same time and/or may be formed at the same time by changes in the culture conditions; and it is intended that each of such antibiotics and any mixtures thereof (whether in the form of the free base or water-soluble salt thereof) be comprehended by the term "streptomycin" when employed unmodified hereinafter.

Streptomycin has been purified heretofore by various methods, all of which were complex and/or inefficient (and consequently expensive). For example, a method widely employed prior to this invention essentially comprised the following steps: (1) treating a primary streptomycin-containing liquid with an activated charcoal, which selectively adsorbs the streptomycin; (2) eluting the streptomycin from the charcoal with an aqueous, water-soluble mineral acid, preferably at a slightly elevated temperature (say about 30-50° C.); (3) treating the eluate with an organic-base-precipitating reagent, preferably phosphotungstic acid; and (4) decomposing the precipitate. [The term "primary streptomycin-containing liquid" comprehends, inter alia: (a) the culture liquid obtained by growing "*Streptomyces griseus*" under conditions and in a medium suitable for the production of streptomycin, and removing the solids from the medium; (b) the culture liquid of enhanced potency obtained by acidification of such culture (with hydrochloric or sulfuric acid, for example), the liquid being neutralized; and (c) the liquid obtained by acid-extraction of the solids separated from such culture, the liquid being neutralized.]

It is the object of this invention to provide simple, efficient, and otherwise advantageous methods of purifying basic antibiotics of the streptomycin type—especially streptomycin; and it is a further object of this invention to provide certain salt-type derivatives of basic antibiotics of the streptomycin type useful in these purification methods and for other purposes, and methods of preparing these derivatives.

It has been found that basic antibiotics of the streptomycin type interact with surface-active agents of the organically-substituted polybasic-inorganic-acid type to form certain salt-type combinations which are much less soluble in water than the anti-biotics and may be recovered; and it has also been found that such salt-type derivatives of the antibiotics may be decomposed to recover the antibiotics.

The methods of this invention essentially comprise interacting a basic antibiotic of the streptomycin type (especially streptomycin) with a surface-active agent of the organically-substituted polybasic-inorganic-acid type in a solvent for the reactants (especially water). The formed salt-type combination of the antibiotic and the surface-active agent is relatively insoluble in water, and may be recovered by filtration, centrifugation or other suitable means when water is employed as the solvent for the reactants. When the employed solvent for the reactants is one (such as methanol) in which the salt-type combination is soluble, the formed salt-type combination is recovered by removing the solvent (and purifying the residue, as by washing with water) or by adding a miscible non-solvent for the salt-type combination (such as water). The purification methods of this invention essentially comprise treating an impure basic antibiotic of the streptomycin type with a surface-active agent of the organically-substituted polybasic-inorganic-acid type in a solvent for the reactants—especially treating an aqueous solution of the impure antibiotic (e. g., a primary streptomycin-containing liquid, or an aqueous solution of a partially-purified streptomycin, such as the eluate referred to hereinbefore) with the surface-active agent—recovering the formed salt-type combination of the antibiotic and the surface-active agent, and converting the latter combination into a water-soluble salt of the antibiotic. Such conversion may be effected, for example, by dissolving the salt-type derivative in a solvent therefor (such as methanol), treating the solution with an aqueous, water-soluble, relatively-strong acid (especially with an aqueous, water-soluble, relatively-strong mineral acid), and recovering the formed water-soluble salt (of the basic antibiotic of the streptomycin type), for example, by adding a miscible non-solvent for the water-soluble salt (such as acetone), and recovering the precipitate. The product thus obtained is considerably purer than the antibiotic treated, and the recovery of antibiotic activity in the purification treatment is of a high order. By the practice of this invention, it is possible to obtain uniformly high yields of relatively-pure streptomycin (for example) having a potency above about 400 units/mg.

Among the preferred surface-active agents of the organically-substituted polybasic-inorganic-acid type for the purposes of this invention are those of the formula R—O—X—O—Y wherein R is the residue of a substantially water-immiscible organic hydroxyl compound, —O—X—O— is the divalent acid-residue of a water-soluble polybasic-inorganic-acid (e. g., sulfuric or phosphoric acid), and Y is a member of the group consisting of H and cations forming water-soluble salts with the anion R—O—X—O—. Notable among such wetting agents for the purposes of this invention are those in which the polybasic-inorganic-acid is sulfuric, and the acid is partially esterified with a higher aliphatic alcohol, i. e., wetting agents of the group consisting of mono (higher-aliphatic) esters of sulfuric acid, and water-soluble salts thereof.

Other preferred surface-active agents of the organically-substituted polybasic-inorganic-acid type for the purposes of this invention are those of the group consisting of aromatic sulfonic acids, sulfonated oils, sulfonated higher fatty acid derivatives, and water-soluble salts thereof.

Among the partial higher-alkyl esters of sulfuric acid utilizable in the practice of this invention are: the group of sodium salts of sulfates of synthetic higher aliphatic alcohols, such as $C_4H_9CH(C_2H_5)C_2H_4CH(SO_4Na)C_2H_4CH(C_2H_5)_2$

[e. g., Tergitol Penetrant 7], $C_4H_9CH(C_2H_5)C_2H_4CH(SO_4Na)CH_2CH(CH_3)_2$

[e. g., Tergitol Penetrant 4], and $C_4H_9CH(C_2H_5)CH_2SO_4Na$

[e. g., Tergitol Penetrant O8]; and the series of partial sulfuric-acid esters of higher aliphatic alcohols and their salts, such as sodium octyl sulfate, sodium oleyl sulfate, sodium cetyl sulfate, sodium stearyl sulfate, and sodium lauryl sulfate [e. g., Aurinol, Wetanol, the Duponols, and the Gardinols]. Among the aromatic sulfonic acids, sulfonated oils, and sulfonated higher fatty acid derivatives utilizable in the practice of this invention are: the sodium sulfonates of higher fatty acid esters and amides, such as the sodium salt of sulfonated ethyl (or other alkyl) oleate [e. g., Igepon AP Extra], and $C_{17}H_{33}CONHC_2H_4SO_3Na$ [e. g., Igepon T]; the sodium sulfonates of petroleum hydrocarbons [e. g., Ultrawet]; the sodium salt of a polyalkyl benzene sulfonic acid having ten carbon atoms [e. g., Ultrawet, 40 A], and other sodium alkyl aryl sulfonates [e. g., Nacconol NRSF]; and Turkey red oil (i. e., sulfonated castor oil). Among the partial esters of phosphoric acids utilizable in the practice of this invention are dicresyl phosphate, lecithin, and a phosphorated higher alcohol of the formula (capryl)$_4Na_6P_6O_{20}$ [e. g., W. A. 58].

Among the water-soluble, relatively-strong acids utilizable for recovery of the antibiotics from their salt-type combinations with the surface-active agents are sulfuric, hydrochloric, phosphoric, oxalic, citric, sulfamic, and nitric.

For maximum efficiency, the amount of the surface-active agent employed should be substantially that required to combine with all the antibiotic in the solution treated, the optimum amount of surface-active agent being therefore dependent on the concentration of the antibiotic solution treated and the potency of the antibiotic. By using the stoichiometric amount of surface-active agent (with respect to the antibiotic activity of the solution treated) one can obtain a practically quantitative recovery of the antibiotic as its salt-type derivative; and the substantially-pure salt-type derivative obtained facilitates recovery of the antibiotic as a water-soluble salt.

In one embodiment of the invention, an aqueous solution of an impure antibiotic of the streptomycin type is treated with an aqueous solution of the surface-active agent, and the precipitate formed is recovered and converted into a water-soluble salt of the antibiotic. Alternatively, the surface-active agent may be added to the antibiotic solution in solid form; or both the antibiotic and the surface-active agent may be added in solid form to water (or other solvent for the reactants).

The salt-type combination of the antibiotic and the surface-active agent may separate from the solvent for the reactants in various forms; e. g., as an oily, waxy or gelatinous material, or may not separate at all but remain dispersed in the solvent (all these insoluble forms being comprehended by the term "precipitate" as employed herein); and depending on its form, the precipitate is separated by filtration, centrifugation, treatment with a filter-aid followed by filtration, or other conventional means known to those skilled in the art.

The precipitation of the salt-type combination of the antibiotic and the surface-active agent is affected by the concentration of the reactants in, and the pH of, the reaction medium-maximum precipitation being obtained when the concentration is high, and the pH is between about 5 and about 8, and preferably around 7.

Alternatively, the salt-type combination of the antibiotic and the surface-active agent formed may be used as a therapeutic agent per se. These salt-type derivatives of antibiotics are, in general, oil-soluble or oil-dispersible; and they may be used therapeutically, e. g., orally administered either per se or in oily media for the treatment of intestinal disorders (relying on intestinal processes to liberate the antibiotic in water-soluble form), or parenterally administered in oily media (or administered by implantation of a pellet of the solid) for prolonged antibiotic action. Where production of the salt-type derivative of the antibiotic—rather than purification of the antibiotic—is the objective, one may employ a reconstituted aqueous solution of the antibiotic (e. g., an aqueous solution of the highly purified or pure antibiotic).

The conversion of the salt-type combination of the antibiotic and the surface-active agent, into a water-soluble salt of the antibiotic may be effected in the following ways, inter alia: by dissolving the salt-type combination in a solvent therefor (e. g., methanol), treating the solution with a water-soluble, relatively-strong acid, and recovering the formed water-soluble salt of the antibiotic (e. g., by adding a miscible non-solvent for the water-soluble salt, such as acetone); by contacting the salt-type combination (in solution) with an adsorbent (e. g., alumina) or anion-exchange resin which has been pretreated with the desired water-soluble, relatively-strong acid, and recovering the formed water-soluble salt of the antibiotic from the treated solution (e. g., by removing the solvent); by dissolving the salt-type combination in a substantially water-immiscible organic solvent for soaps (e. g., n-butanol or refined fermentation-amyl-alcohol), intimately contacting the solution with an aqueous, water-soluble, relatively-strong acid, recovering the aqueous phase, and drying it (preferably freeze-drying; i. e., freezing and subjecting to a high vacuum to sublime off the water); by dissolving the salt-type combination in a solvent therefor in which the desired water-soluble salt is insoluble (e. g., a methanol-acetone mixture), treating the solution with an aqueous, water-soluble, relatively-strong acid, and recovering the precipitated water-soluble salt of the antibiotic; by treating a solution of the salt-type combination with an aqueous, water-soluble, relatively-strong acid in the presence of an anion-exchange resin; or by various other means of effecting intimate contact and interaction of the salt-type combination with the water-soluble, relatively-strong acid.

The following examples are illustrative of the invention (all solutions or dilutions referred to without identification of the solvent or diluent being solutions in or dilutions with water):

Example 1

(a) To 500 ml. of a streptomycin-containing culture filtrate [obtained by growing *Streptomyces griseus* in submerged culture in an aqueous medium containing soybean meal, dextrose, and sodium chloride, acidifying the incubated culture, and filtering], having a potency of 259 units/ml. and a pH of 6.5, 12 ml. of a 25% solution of $C_4H_9CH(C_2H_5)C_2H_4CH(SO_4Na)C_2H_4CH(C_2H_5)_2$

[e. g., Tergitol Penetrant 7] is added with agitation, and the agitation is continued for a half hour. The oil which separates is a salt-type combination of streptomycin and the surface-active agent, and contains about 94% of the culture-filtrate activity.

(b) A salt-type combination thus obtained from a culture filtrate batch of 1,245,000 units activity is dissolved in methanol, reprecipitated once by adding an equal volume of water, redissolved in 80% methanol, and passed through a column of alumina which has previously been washed with hydrochloric acid to pH 4.1, and dried. The percolate (about 250 ml., including methanol wash) is collected; and the streptomycin hydrochloride is recovered by adding an equal volume of water, distilling off the methanol under vacuum, removing any undecomposed salt-type combination, adjusting the pH of the remaining aqueous solution to 5.5, and freeze-drying. About 1.55 g. streptomycin hydrochloride having a potency of 320 units/mg. is thus obtained (a yield of about 40%).

Example 2

0.5 g. of a partial sulfuric-acid ester of a higher aliphatic alcohol [e. g., Duponol C] in 20 ml. water is added to 500 ml. of a streptomycin-containing eluate having a potency of 300 units/ml. and a pH of 6.5 [obtained by treating a streptomycin-containing culture filtrate with an activated charcoal, and eluting the streptomycin from the charcoal with dilute hydrochloric, nitric or sulfuric acid], the cloudy solution is agitated for one hour, and the flocculent precipitate formed is filtered off. The thus-obtained salt-type combination of streptomycin and the surface-active agent contains about 76% of the eluate activity; it may be used as a therapeutic agent per se, or converted into a water-soluble salt of streptomycin; e. g., as described in Example 6 hereinafter.

Example 3

(a) 16 ml. of a 25% solution of $C_4H_9CH(C_2H_5)C_2H_4CH(SO_4Na)C_2H_4CH(C_2H_5)_2$

[e. g., Tergitol Penetrant 7] is added with stirring over a period of one hour to 7 liters of a streptomycin-nitrate-containing eluate having a potency of 195 units/ml. and a pH of 7.0; and the precipitate formed is allowed to age for 1-2 hours at about 5° C., and filtered off. The thus-obtained salt-type combination of streptomycin and the surface-active agent contains about 93% of the eluate activity.

(b) A salt-type combination thus obtained from an eluate batch of 850,000 units activity is pressed or otherwise treated to remove entrained water, and dissolved in sufficient 90–100% methanol (depending on the water-content of the thus partially-dried salt-type combination) to make up a solution in 100 ml. of 90% methanol; and the solution is passed through a 2.5×25 cm. column of anion-exchange resin [e. g., Amberlite IR—4B; cf. U. S. Patent 2,402,384, dated June 18, 1946], which has previously been conditioned with dilute hydrochloric acid to pH 2.5. The percolate is collected in two 125 ml. portions (including methanol wash); and each portion is treated by adding an equal volume of water, distilling off the methanol under vacuum, adjusting the pH of the remaining aqueous solution to 5.5 by treatment with a neutral anion-exchange resin, filtering, and freeze-drying. The first and second portions of the percolate yield, respectively, about 0.8 g. streptomycin hydrochloride having a potency of about 679 units/mg., and about 0.1 g. having a potency of about 425 units/mg. (total yield about 73.1%).

(b: alternative) A salt-type combination thus obtained from an eluate batch of 860,000 units activity (weighing about 4 g.) is dissolved in 150 ml. 90% methanol; and the solution is agitated with 50 g. of an anion-exchange resin which previously has been conditioned with dilute hydrochloric acid. On filtration and freeze-drying the filtrate, about 0.8 g. streptomycin hydrochloride having a potency of about 616 units/mg. is obtained and about 0.14 g. additional streptomycin hydrochloride, having a potency of 635 units/mg., may be obtained from a 90% methanol wash of the resin (total yield, 68%).

Example 4

5.5 ml. of a 25% solution of $C_4H_9CH(C_2H_5)C_2H_4CH(SO_4Na)C_2H_4CH(C_2H_5)_2$

[e. g., Tergitol Penetrant 7] is added to a solution of 1 g. streptomycin hydrochloride having a potency of 525 units/mg. in 100 ml. water, the mixture is shaken a half-hour on a shaking machine, and the waxy precipitate formed is filtered off. The salt-type combination of streptomycin and the surface-active agent thus obtained (weighing about 2.2 g.) contains about 96.5% of the activity of the streptomycin hydrochloride solution treated.

Example 5

A solution of 10 g. of a partial sulfuric-acid ester of a higher aliphatic alcohol [e. g., Dupanol C] in 50 ml. water is added to a solution of 10 g. streptomycin hydrochloride having a potency of 580 units/mg. in 20 ml. water, and the thick gelatinous mixture formed is added to 400 ml. cold water. The gelatinous precipitate formed is collected by centrifugation, washed by re-suspending in water and collecting by centrifugation, and dried in vacuo. The salt-type combination of streptomycin and the surface-active agent thus obtained has a potency of about 350 units/mg., is insoluble in water, soluble in substantially water-immiscible organic solvents for soaps (e. g., refined fermentation-amyl-alcohol), and gives good dispersions in oily media (e. g., peanut oil, or ethyl oleate) having clinical utility.

Example 6

1.5 g. of a salt-type combination of streptomycin and a partial sulfuric-acid ester of a higher aliphatic alcohol, obtained, for example, as described in Example 2 (the streptomycin component of which has an activity of 376,000 units, as determined by chemical assay) is dissolved in 25 ml. methanol, and 25 ml. acetone is added. 0.5 ml. concentrated hydrochloric acid is then added (to pH about 1.2), followed by an additional 50 ml. acetone. The resulting precipitate (streptomycin hydrochloride) is filtered off and dissolved in water; and the solution is adjusted to pH 6.8 by addition of neutral anion-exchange resin, and freeze-dried. About 0.7 g. streptomycin hydrochloride having a potency of about 425 units/mg. is thus obtained. (Yield, about 79%.)

Example 7

280 ml. of a 25% solution of a partial sulfuric-acid ester of a higher aliphatic alcohol [e. g., Dupanol C] is slowly added to a solution of 50 g. partially-purified streptomycin sulfate in 24 liters distilled water, having a potency of 1000 units/ml.; and the white flocculent precipitate formed is isolated by centrifugation, and dried in vacuo (10 mm.) at room temperature for 12 hours. The salt-type combination thus obtained in a yield of about 57 g. has a potency of about 224 units/mg., and is suitable for clinical use either per se or in various pharmaceutical forms.

Using 310 ml. of a clarified (carbon treated) 25% solution of the surface-active agent $C_4H_9CH(C_2H_5)C_2H_4CH(SO_4Na)C_2H_4CH(C_2H_5)_2$

[e. g., Tergitol Penetrant 7] as the solution of surface-active agent in the foregoing procedure, a salt-type combination having a potency of about 293 units/mg. is obtained in a yield of about 50 g.

Example 8

A solution of 35 g. of a partial sulfuric-acid ester of a higher aliphatic alcohol [e. g., Dupanol C] in 350 ml. water, having a pH of 9.7, is added with stirring to a solution of 30 g. streptomycin sulfate having a potency of 490 units/mg. and a pH of 5.2; and the solid which precipitates is separated by centrifugation, and washed with water by centrifugation. The salt-type combination thus obtained is resuspended in 400 ml. water, and the suspension is freeze dried, yielding about 38.5 g. of a white fluffy solid having a potency of 320 units/mg. (On washing with water, resuspending in water, and freeze-drying the suspension, the last traces of inorganic salt are removed.)

The salt-type combination thus obtained is only slightly soluble in water, and disperses well in peanut oil, ethyl oleate, and other oily media. A smooth dispersion suitable for intra-muscular injection and having a potency of 200,000 units/ml. may be obtained, for example, by adding slowly, with stirring, 1 ml. peanut oil (or ethyl oleate) to 666 mg. of the salt-type combination.

Example 9

2.1 ml. of a 25% solution of $C_4H_9CH(C_2H_5)C_2H_4CH(SO_4Na)C_2H_4CH(C_2H_5)_2$

[e. g., Tergitol Penetrant 7] is added with agitation to a solution of 0.5 g. dihydrostreptomycin sulfate in 250 ml. water, having a potency of 1210 units/ml.; and the precipitated salt-type combination (containing over 83% of the activity of the solution treated) is recovered by filtration.

Similar treatment of an aqueous solution of streptothricin hydrochloride having a potency of 500 units/mg. yields the corresponding salt-type derivative of streptothricin.

Example 10

60 g. of a salt-type combination of streptomycin and surface-active agent obtained as described in section (a) of Example 1, having a potency of 243 units/mg., is dissolved in 400 ml. methyl amyl acetate (4-methylpentylacetate-2); 40 ml. concentrated hydrochloric acid is added and the mixture is stirred vigorously; and 40 ml. water is added and stirring continued for 10 minutes. The aqueous layer formed on separation is recovered, neutralized with a neutral anion-exchange resin [e. g., Amberlite IR-4B], and filtered. The filtrate (and wash), having a total volume of about 190 ml., has a potency of about 65,000 units/ml. (an about 85% recovery). [Washing of the methyl amyl acetate layer with 60 ml. water, neutralization of the wash, and filtration yields additional filtrate having a potency of 16,000 units/ml. (the total recovery being about 97%).] The solid streptomycin hydrochloride obtained on freeze-drying has a potency of about 575 units/mg.

Example 11

A streptomycin-containing culture-filtrate having a potency of 211 units/ml. and a pH of 1.5 is treated with 1 g. of an activated carbon [e. g., Darco S-51] per 20,000 units, and filtered; and the filtrate is adjusted to pH 6.5-7.0. A 25% solution of $C_4H_9CH(C_2H_5)C_2H_4CH(SO_4Na)C_2H_4CH(C_2H_5)_2$

[e. g., Tergitol Penetrant 7] is added to the filtrate, in the proportion of 1 ml. of the solution of surface-active agent to 66,400 units streptomycin; and the precipitate formed is allowed to stand for 12-16 hours, and filtered off. The thus-obtained salt-type combination, on decomposition as described in section (b) of Example 3, yields a streptomycin hydrochloride having a potency of about 416 units/mg. (about 54% yield).

Example 12

A streptomycin hydrochloride having a histamine content of 0.1 mg. for each 207 units streptomycin activity is converted into a salt-type combination with a surface-active agent as described in section (a) of Example 3; and the salt-type combination is decomposed as described in section (b) of that example. The thus-obtained streptomycin hydrochloride has a histamine content of 0.1 mg. for each 610 units streptomycin activity.

Example 13

20 g. of a salt-type combination of streptomycin and surface-active agent obtained as described in section (a) of Example 1 (the streptomycin component of which has an activity of 4,240,000 units) is dissolved in 100 ml. methanol; and a slurry of 40 g. of an anion-exchange resin [e. g., Amberlite IR-4B] in 300 ml. water, having a pH of 6.5, is added. Then, while agitating and maintaining the mixture at 50-55° C., concentrated hydrochloric acid is added dropwise at such rate that the pH is maintained at 3.0-3.5. The endpoint of the decomposition is determinable by following the increase of maltol precursor in the aqueous solution.) After an hour (during which about 3.5 ml. concentrated hydrochloric acid has been added), the pH is allowed to rise to 5.0-5.5; the solution is filtered; the methanol is removed from the filtrate by evaporation in vacuo; and the residual solution is freeze-dried, yielding about 6.5 g. streptomycin hydrochloride having a potency of about 578 units/mg. (about 90% yield).

Example 14

15 g. of a salt-type combination of streptomycin and surface-active agent obtained as described in section (a) of Example 1 (the streptomycin component of which has an activity of 2,960,000 units) is dissolved in 100 ml. methanol; and dry HCl is passed into the solution until no more precipitation occurs. The mixture is then diluted with 500 ml. acetone; and the precipitate is filtered off and dissolved in 100 ml. water. The pH of the solution is adjusted to 5.5 by addition of a neutral anion-exchange resin [e. g., Amberlite IR-4B]; the solution is filtered; and the filtrate is freeze-dried, yielding about 4.96 g. streptomycin hydrochloride having a potency of about 385 units/mg. (a yield of about 64.5%).

Example 15

(a) 1000 gals. of a streptomycin-containing culture filtrate, having a potency of 400 units/mg. and a pH of 3-4, is heated to 20° C., and neutralized to pH 7.5±0.2 by adding 10% sodium hydroxide solution (about 4.5 gals. being required); and the neutralized solution is treated with 251 lbs. activated carbon [e. g., Darco G-60] and 20 lbs. filter aid [e. g., Hyflo]. The slurry is stirred for an hour and filtered; and the carbon cake is washed with at least 100 gals. water, and blown dry with air.

251 gals. of the second eluate from a previous elution, such as described hereinafter, is made up to a volume of 753 gals. by addition of tap water; the carbon cake described in the preceding paragraph is added; the slurry is maintained at 35-40° C., while stirring; and the pH of the suspension is adjusted to 2.2±0.2 by addition of 10% nitric acid (about 14.1 lbs. being required). After stirring for an hour, the carbon is removed by filtration and blown dry, and the filtrate (first eluate) is collected.

The once-extracted carbon is added to 251 gallons fresh tap water for a second elution, which is effected as described in the preceding paragraph, a small amount of 10% nitric acid being added (if necessary) to re-adjust the pH to 2.2±0.2. The thus-obtained second eluate is used for the first elution described in the preceding paragraph. The total yield from the culture filtrate is about 82%.

The first eluate is adjusted to pH 7.5±0.1 with 10% sodium hydroxide solution (about 4.2 gals. being required), while maintaining the temperature at 10° C. or below; 7.5 lbs. of a filter aid [e. g., Hyflo] is added; and the slurry is filtered. The colorless (iron-free) filtrate, at 10-15° C., is charged with half the total volume of a 25% solution of

$C_4H_9CH(C_2H_5)C_2H_4CH(SO_4Na)C_2H_4CH(C_2H_5)_2$

[e. g., Tergitol Penetrant 7] required for precipitation of the streptomycin (the amount being based on the activity of the eluate, as determined by chemical assay, in the ratio of 1 ml. per 92,400 units streptomycin). After this portion of the surface-active agent has been added, the testing for completeness of precipitation is begun (a sample of the slurry being filtered and about 2 ml. of filtrate being collected; and 1-2 drops 50% phosphotungstic acid being added to the filtrate, which forms a precipitate if the precipitation by the surface-active agent was incomplete). More of the solution of surface-active agent is then charged in one-liter portions, until the test shows complete precipitation (about 28.7 lbs., or 3.4 gals. of a 25% solution of the surface-active agent being required for complete precipitation). The batch is stirred for a half hour, and the solid (salt-type combination) recovered by centrifuging. The yield from the culture filtrate is about 73.8%, the precipitation efficiency being about 90%.

(b) The wet salt-type combination is dissolved in 90% methanol at 20-25° C., in a ratio of 15 g. per 100 ml. solvent (over six gals. methanol being required); the solution is filtered; the filtrate is charged slowly with sufficient concentrated hydrochloric acid to decompose the salt-type combination and lower the pH to 0.8±0.1 (about 0.9 lb. acid being required); and the mixture is drowned in 194 lbs. acetone, and allowed to stand for an hour at 5-10° C. The precipitate (streptomycin hydrochloride) is filtered as dry as possible on a vacuum filter, and then dissolved in water, using a ratio of 100 ml. water per 10 g. of the salt-type combination treated (about six gals. water being required). The solution is neutralized by stirring with about 1.09 lbs. neutral anion-exchange resin [e. g., Amberlite IR—4B] of pH 6.5, to adjust the pH of the streptomycin hydrochloride to its most stable pH range of 6.0-6.5. The resulting mixture is filtered; the filtrate is distilled free of methanol and acetone at 15-20 mm., and filtered; and the filtrate is freeze-dried. The yield of streptomycin hydrochloride thus obtained from the culture filtrate is about 51.8%, the decomposition yield being about 70%.

[The neutral anion-exchange resin employed may be prepared as follows: 10 lbs. of anion-exchange resin (e. g., Amberlite IR—4B) is added to 10 gals. tap water; sufficient 10% sodium carbonate solution is added to adjust the pH to 10.5±0.2; and the alkaline resin is washed with distilled water until the pH of the aqueous medium reaches 6.5. The neutral resin is stored in the aqueous medium until employed for neutralization; i. e., is filtered from the aqueous medium just before it is to be used.]

(b: alternative) 15.2 lbs. of the dry salt-type combination is dissolved in absolute methanol at 20–25° C., in the ratio of 20 g. of the salt-type combination per 100 ml. 100% methanol (at least 9 gals. methanol being required); the solution is filtered; 45.5 lbs. of a neutral (pH 6.5) anion-exchange resin [e. g., Amberlite IR—4B] is added to the filtrate; and sufficient water is added to the resulting slurry to make a 25% methanol medium (about 27 gals. water being required). The slurry (volume about 42 gals.) is heated to 50–55° C., and maintained at that temperature while 0.5 gal. concentrated hydrochloric acid is added at such rate that the pH of the mixture is maintained between 3.0 and 3.5. Then the mixture is stirred until the pH rises to its maximum, between 5.6 and 6.2 (if the pH is below 6, small amounts of neutral anion-exchange resin are added until the final pH is between 6 and 6.5). The slurry is then filtered, and the resin is washed with sufficient water to remove any adhering streptomycin hydrochloride; the combined filtrate and wash (volume about 47.5 gals., having a potency of about 6,500 units/ml.) is then concentrated to about 3 gals.; and the streptomycin hydrochloride is recovered by freeze-drying. The decomposition yield is 60–80%.

The surface-active agents employed in the foregoing examples may be replaced by equivalent amounts of other surface-active agents of the organically-substituted polybasic-inorganic-acid type (exemplificative subgenera and species of which are named hereinbefore). Among other salt-type derivatives of streptomycin obtainable in accordance with this invention and especially suitable for therapeutic use per se (and in pharmaceutical forms) are those obtainable with

$C_4H_9CH(C_2H_5)C_2H_4CH(SO_4Na)CH_2CH(CH_3)_2$

[e. g., Tergitol Penetrant 4] and with partial sulfuric-acid esters of higher aliphatic alcohols of different molecular weights and their salts [e. g., the various Duponols].

Among other basic antibiotics of the streptomycin type utilizable for the prepartion of salt-type combinations with the surface-active agents in accordance with this invention are pure (or substantially-pure) streptomycin A, streptomycin B, dihydrostreptomycin A. dihydra streptomycin B, and streptothricin.

The basic antibiotic of the streptomycin type purified by the method of this invention may be further purified by repetition of the same purification method. Also, it may be preliminarily purified or further purified by any other method, especially by one of the following: (I) intimately contacting an aqueous solution of the antibiotic with a substantially water-insoluble carboxylic acid and a substantially water-immiscible organic solvent for the carboxylic acid, recovering the organic solvent phase, and converting the salt-type derivative of the antibiotic therein into a water-soluble salt of the antibiotic; (cf. application Serial No. 762,205, filed July 19, 1947); (II) treating an aqueous solution of the antibiotic with a water-soluble salt of a substantially water-insoluble carboxylic acid, recovering the precipitated salt-type combination of the antibiotic and the carboxylic acid, and converting it into a water-soluble salt of the antibiotic (cf. application Serial No. 762,206, filed July 19, 1947); and (III) intimately contacting an aqueous solution of the antibiotic with a surface-active agent of the organically-substituted polybasic-inorganic-acid type and a substantially water-immiscible organic solvent for soaps, recovering the organic solvent phase, and converting the salt-type derivative of the antibiotic therein into a water-soluble salt of the antibiotic (cf. application Serial No. 767,851, filed of even date herewith).

The invention may be variously otherwise embodied within the scope of the appended claims.

We claim:

1. The method which comprises interacting an antibiotic of the group consisting of streptomycin, dihydrostreptomycin, and streptothricin with a surface-active agent of the group consisting of mono (higher-aliphatic) esters of sulfuric acid and water-soluble salts thereof, in a solvent for the reactants.

2. The method which comprises interacting streptomycin with a surface-active agent of the group consisting of mono (higher-aliphatic) esters of sulfuric acid and water-soluble salts thereof, in water.

3. The method which comprises interacting an antibiotic of the group consisting of streptomycin, dihydrostreptomycin, and streptothricin with a surface-active agent of the group consisting of mono (higher-aliphatic) esters of sulfuric acid and water-soluble salts thereof, in a solvent for the reactants, and recovering the formed salt-type combination of the antibiotic and the surface-active agent.

4. The method of purifying an antibiotic of the group consisting of streptomycin, dihydrostreptomycin, and streptothricin, which comprises treating an impure member of said group with a surface-active agent of the group consisting of mono (higher-aliphatic) esters of sulfuric acid and water-soluble salts thereof, in a solvent for the reactants, recovering the formed salt-type combination of the antibiotic and the surface-active agent, and converting the latter combination into a water-soluble salt of the antibiotic.

5. The method of purifying streptomycin, which comprises treating impure streptomycin with a surface-active agent of the group consisting of mono (higher-aliphatic) ester of sulfuric acid and water-soluble salts thereof, in water, recovering the insoluble salt-type combination of streptomycin and the surface-active agent, and converting the latter combination into a water-soluble salt of streptomycin.

6. The method which comprises treating an antibiotic of the group consisting of streptomycin, dihydrostreptomycin, and streptothricin with a surface-active agent of the group consisting of mono (higher-aliphatic) esters of sulfuric acid and water-soluble salts thereof, in a solvent for the reactants, the surface-active agent being in stoichiometric amount with respect to the antibiotic activity of the solution, and recovering the insoluble salt-type combination of the antibiotic and the surface-active agent.

7. The method which comprises treating a water solution of an antibiotic of the group consisting of streptomycin, dihydrostreptomycin, and streptothricin with a water solution of a surface-active agent of the group consisting of mono (higher-aliphatic) esters of sulfuric acid and water-soluble salts thereof, and recovering the insoluble salt-type combination of the antibiotic and the surface-active agent.

8. The method which comprises treating a water solution of an antibiotic of the group consisting of streptomycin, dihydrostreptomycin, and streptothricin, having a pH between about 5 and about 8, with a water solution of a surface-active agent of the group consisting of mono (higher-aliphatic) esters of sulfuric acid and water-soluble salts thereof, and recovering the insoluble salt-type combination of the antibiotic and the surface-active agent.

9. A salt-type combination of streptomycin and a mono (higher-aliphatic) ester of sulfuric acid.

10. A salt-type combination of an antibiotic of the group consisting of streptomycin, dihydrostreptomycin, and streptothricin and a mono (higher-aliphatic) ester of sulfuric acid.

11. The method which comprises interacting streptomycin with the compound $C_4H_9CH(C_2H_5)C_2H_4CH(SO_4NA)C_2H_4CH(C_2H_5)_2$ in water.

12. A salt-type combination of streptomycin and the compound $C_4H_9CH(C_2H_5)C_2H_4CH(SO_4NA)C_2H_4CH(C_2H_5)_2$

WILLIAM A. LOTT.
JACK BERNSTEIN.
LEON J. HEUSER.

REFERENCES CITED

The following references are of record in the file of this patent:

UNITED STATES PATENTS

| Number | Name | Date |
|---|---|---|
| 2,052,192 | Piggott | Aug. 25, 1936 |
| 2,053,474 | Graves et al. | Sept. 8, 1936 |
| 2,104,728 | Bertsch et al. | Jan. 11, 1938 |
| 2,245,339 | Warnat | June 10, 1941 |
| 2,441,063 | Gilmann | May 4, 1948 |

OTHER REFERENCES

Kuehl et al., Science, v. 102 (1945), p. 34–35, 2 pages.

Kolmer et al., Science, v. 104, (1946), p. 315–317, 3 pages.